United States Patent
Chandrasekaran et al.

(10) Patent No.: US 12,517,787 B2
(45) Date of Patent: Jan. 6, 2026

(54) HOST ORCHESTRATED DATA COPY BETWEEN DATA STORAGE SYSTEMS WITH ERROR DETECTION AND ERROR CORRECTION

(71) Applicant: Dell Products L.P., Round Rock, TX (US)

(72) Inventors: Hari Prasad Chandrasekaran, Bangalore (IN); Karthik Venkatasubba, Bangalore (IN); Fedor Kusov, Cork (IE)

(73) Assignee: Dell Products L.P., Round Rock, TX (US)

( * ) Notice: Subject to any disclaimer, the term of this patent is extended or adjusted under 35 U.S.C. 154(b) by 3 days.

(21) Appl. No.: 18/623,503

(22) Filed: Apr. 1, 2024

(65) Prior Publication Data
US 2025/0307074 A1    Oct. 2, 2025

(51) Int. Cl.
*G06F 11/10*    (2006.01)
*G06F 11/14*    (2006.01)

(52) U.S. Cl.
CPC ...... *G06F 11/1084* (2013.01); *G06F 11/1451* (2013.01); *G06F 11/1469* (2013.01)

(58) Field of Classification Search
CPC ............. G06F 11/1084; G06F 11/1451; G06F 11/1469
USPC .......................................................... 714/6.24
See application file for complete search history.

(56) References Cited

U.S. PATENT DOCUMENTS

| | | | |
|---|---|---|---|
| 2003/0028723 A1 | 2/2003 | Segev et al. | |
| 2005/0172196 A1 | 8/2005 | Osecky et al. | |
| 2005/0289559 A1 | 12/2005 | Illowsky et al. | |
| 2015/0106393 A1 | 4/2015 | Yeom et al. | |
| 2024/0403040 A1* | 12/2024 | N .............................. | G06F 8/72 |

* cited by examiner

*Primary Examiner* — Yair Leibovich
(74) *Attorney, Agent, or Firm* — BainwoodHuang

(57) ABSTRACT

A host performs an optimized copy operation by reading an optimized version of data from a source data storage system, and then writing the optimized version of the data to a target data storage system. The target uses the optimized version of the data to generate a complete unoptimized copy of the data, and obtains data verification information from the source through an independent error detection communication channel that is independent from the host. The target uses the data verification information and the complete unoptimized copy of the data to perform an error detection operation that identifies any chunk within the complete unoptimized copy of the data in the target that does not match the data in the source. The target indicates the non-matching chunks to the host, and the host performs an unoptimized copy of those chunks from the source to the target to correct the error.

17 Claims, 3 Drawing Sheets

---

302 PERFORM, BY A HOST, AN OPTIMIZED COPY OPERATION THAT READS AN OPTIMIZED VERSION OF THE DATA FROM THE SOURCE DATA STORAGE SYSTEM TO THE HOST AND THEN WRITES THE OPTIMIZED VERSION OF THE DATA FROM THE HOST TO THE TARGET DATA STORAGE SYSTEM

304 GENERATE, IN THE TARGET DATA STORAGE SYSTEM USING THE OPTIMIZED VERSION OF THE DATA, A COMPLETE UNOPTIMIZED COPY OF THE DATA

306 OBTAIN, BY THE TARGET DATA STORAGE SYSTEM FROM THE SOURCE DATA STORAGE SYSTEM THROUGH AN ERROR DETECTION COMMUNICATION CHANNEL THAT IS INDEPENDENT FROM THE HOST AND THAT CONNECTS THE SOURCE DATA STORAGE SYSTEM TO THE TARGET DATA STORAGE SYSTEM, DATA VERIFICATION INFORMATION

308 PERFORM, BY THE TARGET DATA STORAGE SYSTEM USING THE DATA VERIFICATION INFORMATION AND THE COMPLETE UNOPTIMIZED COPY OF THE DATA IN THE TARGET DATA STORAGE SYSTEM, AN ERROR DETECTION OPERATION THAT IDENTIFIES ANY CHUNK WITHIN THE COMPLETE UNOPTIMIZED COPY OF THE DATA IN THE TARGET DATA STORAGE SYSTEM THAT DOES NOT MATCH THE DATA IN THE SOURCE DATA STORAGE SYSTEM

HOST ORCHESTRATED DATA COPY BETWEEN DATA STORAGE SYSTEMS WITH ERROR DETECTION AND ERROR CORRECTION

TECHNICAL FIELD

The present disclosure relates generally to technology for reliably copying data between data storage systems.

BACKGROUND

Data storage systems are arrangements of hardware and software that are coupled to non-volatile data storage drives, such as solid state drives and/or magnetic disk drives. The data storage system services host I/O requests received from physical and/or virtual host machines ("hosts"). The host I/O requests received by the data storage system specify host data that is written and/or read by the hosts. The data storage system executes software that processes the host I/O requests by performing various data processing tasks to efficiently organize and persistently store the host data in the non-volatile data storage drives of the data storage system.

A host may need to copy data from one data storage system to another data storage system. Unfortunately, data corruption may occur during the copy operation. Prompt detection of any data corruption occurring during the copy operation, and avoiding costly problems that may result from such data corruption, have been significant technical challenges.

SUMMARY

In the disclosed technology, a host copies data from a source data storage system to a target data storage system. The host first performs an optimized copy operation that includes the host reading an optimized version of the data from the source data storage system to the host and then writing the optimized version of the data from the host to the target data storage system. The target data storage system then generates, in the target data storage system using the optimized version of the data, a complete unoptimized copy of the data. The target data storage system obtains, from the source data storage system through an error detection communication channel that is independent from the host and that connects the source data storage system to the target data storage system, data verification information. The target data storage system uses the data verification information and the complete unoptimized copy of the data in the target data storage system to perform an error detection operation that identifies any chunk within the complete unoptimized copy of the data in the target data storage system that does not match the data in the source data storage system.

The target data storage system may identify, during the error detection operation, at least one chunk within the complete unoptimized copy of the data stored in the target data storage system that does not match the data in the source data storage system. In that case, the target data storage system identifies, to the host, the at least one chunk within the complete unoptimized copy of the data stored in the target data storage system that does not match the data in the source data storage system. In response to receiving the indication from the target data storage system of the at least one chunk within the complete unoptimized copy of the data in the target data storage system that does not match the data in the source data storage system, the host performs an unoptimized copy operation that reads an unoptimized version of a portion of the data from the source data storage system. The portion of the data read by the host from the source data storage system includes at least one chunk within the data stored in the source data storage system that corresponds to the at least one chunk within the complete unoptimized copy of the data stored in the target data storage system that does not match the data in the source data storage system. The host then writes the unoptimized version of the portion of the data from the host to the target data storage system.

In some embodiments, the target data storage system generates, in the target data storage system using the unoptimized version of the portion of the data, a new complete unoptimized copy of the data. The target data storage system then performs, using the data verification information and the new complete unoptimized copy of the data in the target data storage system, a second error detection operation that identifies any chunk within the new complete unoptimized copy of the data in the target data storage system that still does not match the data stored in the source data storage system. In response to identifying no chunks within the new complete unoptimized copy of the data in the target data storage system that do not match the data stored in the source data storage system, the target data storage system indicates to the host that the data in the source data storage system has been successfully copied to the target data storage system.

In some embodiments, the data in the source data storage system is a most recent snapshot of a storage volume consumed by the host, and a previous snapshot of the storage volume was copied in its entirety from the source data storage system to the target data storage system at a previous point in time. In such embodiments, the host performs the optimized copy operation at least in part by first obtaining a difference list from the source data storage system. The difference list indicates which chunks of the most recent snapshot of the storage volume differ from the previous snapshot of the storage volume. The host then reads, based on the difference list, the chunks of the most recent snapshot of the storage volume that differ from the previous snapshot of the storage volume, and writes the chunks of the most recent snapshot of the storage volume that differ from the previous snapshot of the storage volume to the target data storage system.

In some embodiments, the host performs the unoptimized copy operation at least in part by mounting the most recent snapshot of the storage volume in the source data storage system for complete and unoptimized access by the host, reading the un-optimized version of the portion of the data from the mounted most recent snapshot in the source data storage system, and unmounting the most recent snapshot of the storage volume in the source data storage system when the unoptimized copy operation is completed.

The at least one chunk within the complete unoptimized copy of the data stored in the target data storage system that does not match the data in the source data storage system may, for example, be a chunk that is not be one of the chunks indicated by the difference list.

In some embodiments, the data verification information is multiple checksums generated by the source data storage system based on the data in the source data storage system. The error detection operation may include the target storage system comparing the checksums generated by the source data storage system based on the data in the source data storage system to a plurality of checksums generated by the target data storage system based on the complete unoptimized copy of the data in the target data storage system.

In some embodiments, the host reads the optimized version of the data from the source data storage system and writes the optimized version of the data to the target data storage system over a data path that connects the host to the source data storage system and target data storage system, and that is separate from and independent of the error detection communication channel that connects the source data storage system to the target data storage system.

In some embodiments, the optimized version of the data is a compressed version of the data, the unoptimized version of the portion of the data is an uncompressed version of the portion of the data, and the complete unoptimized copy of the data is an uncompressed version of the data.

In some embodiments, the optimized version of the data is a deduplicated version of the data, the unoptimized version of the portion of the data is a non-deduplicated version of the portion of the data, and the complete unoptimized copy of the data is a non-deduplicated version of the data.

In some embodiments, the optimized version of the data is an encrypted version of the data, the unoptimized version of the portion of the data is a non-encrypted version of the portion of the data, and the complete unoptimized copy of the data is a non-encrypted version of the data.

In some embodiments, the target data storage system indicates the at least one chunk within the complete unoptimized copy of the data stored in the target data storage system that does not match the data in the source data storage system by sending a mismatch location bitmap to the host indicating the positions of chunks within the complete unoptimized copy of the data stored in the target data storage system that do not match the data in the source data storage system. The host performs the unoptimized copy operation by using the mismatch location bitmap to read those chunks of the most recent snapshot of the storage volume that are indicated by the mismatch bitmap from the data stored in the source storage system, and then writing those chunks of the most recent snapshot of the storage volume that were read from the data stored in the source storage system based on the mismatch location bitmap to the target data storage system.

In some embodiments, the error detection operation and the optimized copy operation are performed at least partly in parallel.

In some embodiments, the error detection operation and the unoptimized copy operation are performed at least partly in parallel.

The disclosed technology is integral to providing a practical technical solution to the problem of promptly detecting and correcting data corruption occurring during a host orchestrated data copy from a source data storage system to a target data storage system. When such data corruption occurs during an optimized copy operation, it may be the result of a bug present within the optimized copy logic that optimized the data in the source data storage system before the data was copied by the host to the target data storage system. In previous systems, this type of data corruption has sometimes not been detected until the previously copied data was later accessed and attempted to be used, at which time an operation that used the copied data failed. Under such circumstances, identifying the bug as being present within the optimized copy logic without the disclosed technology has been difficult. The disclosed technology advantageously detects data corruption as it occurs during the host orchestrated data copy, and automatically fixes the data corruption independent from the potentially buggy optimized copy logic. The detection and correction of the data corruption can then immediately be reported to a monitoring and analyzing system, along with indications of relevant log portions, so that the bug can be promptly located and addressed.

The foregoing summary does not indicate required elements, or otherwise limit the embodiments of the disclosed technology described herein. The technical features described herein can be combined in any specific manner, and all combinations may be used to embody the disclosed technology.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed on illustrating the principles of the disclosed technology.

DETAILED DESCRIPTION

Figure 1:
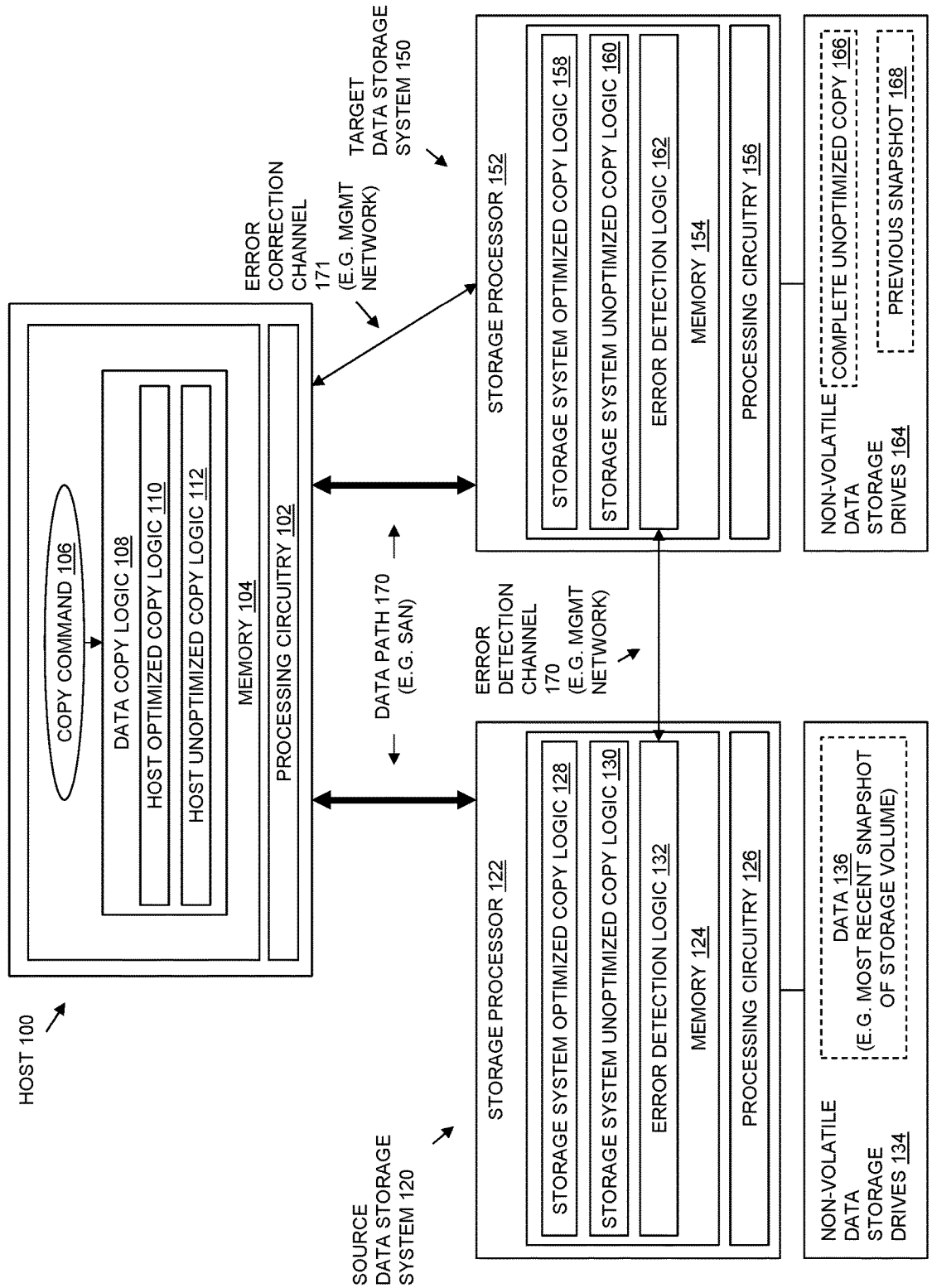
FIG. 1 is a block diagram showing an illustrative embodiment of the disclosed technology.

Embodiments will now be described with reference to the figures. The embodiments described herein are not limiting, and are provided only as examples, in order to illustrate various features and principles of the disclosed technology. The embodiments of disclosed technology described herein are integrated into a practical solution to the problem of promptly detecting and correcting data corruption that occurs during a host orchestrated data copy from a source data storage system to a target data storage system.

The disclosed technology operates when a host copies data from a source data storage system to a target data storage system. An optimized copy operation is first performed by the host. The optimized copy operation includes the host i) reading an optimized version of the data from the source data storage system to the host, and then ii) writing the optimized version of the data from the host to the target data storage system. A complete unoptimized copy of the data is then generated in the target data storage system by the target data storage using the optimized version of the data. During and/or subsequent to the optimized copy operation, the target data storage system obtains, from the source data storage system through an error detection communication channel that is independent from the host and that connects the source data storage system to the target data storage system, data verification information. During and/or subsequent to the optimized copy operation, the target data storage system uses the data verification information obtained from the source data storage system and the complete unoptimized copy of the data generated and stored in the target data storage system to perform an error detection operation that identifies any chunk within the complete unoptimized copy of the data in the target data storage system that does not match the data in the source data storage system.

For example, the target data storage system may identify, during the error detection operation, at least one chunk within the complete unoptimized copy of the data stored in the target data storage system that does not match the data in the source data storage system. In such a case, the target data storage system identifies, to the host, the at least one chunk within the complete unoptimized copy of the data stored in the target data storage system that does not match the data in the source data storage system. In response to receipt of the indication from the target data storage system of the at least one chunk within the complete unoptimized copy of the data in the target data storage system that does not match the data in the source data storage system, the host then performs an unoptimized copy operation that reads an unoptimized version of a portion of the data from the source data storage system. The portion of the data read by the host from the source data storage system during the unoptimized copy operation includes at least one chunk within the data in the source data storage system that corresponds to the at least one chunk within the complete unoptimized copy of the data in the target data storage system that does not match the data in the source data storage system. The host then writes the unoptimized version of the portion of the data from the host to the target data storage system. The retrieval from the source data storage system of the unoptimized version of the portion of the data, and the writing of the retrieved unoptimized version of the portion of the data, avoids use of data optimization logic (e.g. within the source data storage system) that may be responsible for the detected data mismatch.

After receiving the unoptimized version of the portion of the data from the host, the target data storage system generates, within the target data storage system using the unoptimized version of the portion of the data, a new complete unoptimized copy of the data. The target data storage system may then perform, using the data verification information and the new complete unoptimized copy of the data in the target data storage system, a second error detection operation that will identify any chunk within the new complete unoptimized copy of the data in the target data storage system that still does not match the data stored in the source data storage system. In response to the second error detection operation identifying no chunks within the new complete unoptimized copy of the data in the target data storage system that do not match the data stored in the source data storage system, the target data storage system indicates to the host that the data has been successfully copied to the target data storage system.

Further in the disclosed technology, the data in the source data storage system may be a most recent snapshot of a storage volume, and a previous snapshot of the storage volume has been copied in its entirety from the source data storage system to the target data storage system at a previous point in time. The host may then perform the optimized copy operation at least in part by first obtaining a difference list from the source data storage system, the difference list indicating which chunks of the most recent snapshot of the storage volume differ from the previous snapshot of the storage volume. Further in the optimized copy operation, the host may then read, based on the difference list, the chunks of the most recent snapshot of the storage volume that differ from the previous snapshot of the storage volume, and write the chunks of the most recent snapshot of the storage volume that differ from the previous snapshot of the storage volume to the target data storage system.

Further in the disclosed technology, the host may perform the unoptimized copy operation at least in part by i) mounting the most recent snapshot of the storage volume in the source data storage system for complete and unoptimized access by the host, ii) reading the unoptimized version of the portion of the data from the mounted most recent snapshot in the source data storage system, and iii) un-mounting the most recent snapshot of the storage volume in the source data storage system when the unoptimized copy operation is completed.

For example, the at least one chunk within the complete unoptimized copy of the data stored in the target data storage system that does not match the data in the source data storage system may, for example, be a chunk of the data that is not one of the chunks indicated by the difference list obtained during the optimized copy operation.

In another example, the data verification information may be multiple checksums generated by the source data storage system based on the data in the source data storage system. The error detection operation may include the target storage system comparing the checksums generated by the source data storage system based on the data stored in the source data storage system to a plurality of checksums generated by the target data storage system based on the complete unoptimized copy of the data stored in the target data storage system.

Further in the disclosed technology, the host may read the optimized version of the data from the source data storage system and write the optimized version of the data to the target data storage system over a data path that i) connects the host to the source data storage system and target data storage system and ii) is separate from and independent of the error detection communication channel that connects the source data storage system to the target data storage system.

The optimized version of the data may alternatively be a compressed version of the data, the unoptimized version of the portion of the data may be an uncompressed version of the portion of the data, and the complete unoptimized copy of the data may be an uncompressed version of the data.

The optimized version of the data may alternatively be a deduplicated version of the data, the unoptimized version of the portion of the data may be a non-deduplicated version of the portion of the data, and the complete unoptimized copy of the data may a non-deduplicated version of the data.

The optimized version of the data may alternatively be an encrypted version of the data, the unoptimized version of the portion of the data may be a non-encrypted version of the portion of the data, and the complete unoptimized copy of the data may be a non-encrypted version of the data.

The target data storage system may indicate the at least one chunk within the complete unoptimized copy of the data stored in the target data storage system that does not match the data in the source data storage system by sending a mismatch location bitmap to the host indicating the positions of chunks within the complete unoptimized copy of the data stored in the target data storage system that do not match the data in the source data storage system. The host performs the unoptimized copy operation by using the mismatch location bitmap to read those chunks of the most recent snapshot of the storage volume that are indicated by the mismatch bitmap from the data stored in the source storage system, and then writing those chunks of the most recent snapshot of the storage volume that were read from the data stored in the source storage system based on the mismatch location bitmap to the target data storage system.

The error detection operation and the optimized copy operation may be performed at least partly in parallel, and the error detection operation and the unoptimized copy operation may be performed at least partly in parallel.

FIG. 1 is a block diagram showing an example of an operational environment in which the disclosed technology is embodied, including a Host 100, Source Data Storage System 120, and Target Data Storage System 150. Host 100 of FIG. 1 and/or applications executing thereon access non-volatile data storage provided by Source Data Storage System 120 and Target Data Storage System 150 over a data path that is connected to communication interfaces of Host 100, such as a Storage Area Network (SAN) or the like, shown for purposes of illustration in FIG. 1 Data Path 170.

Source Data Storage System 120 and Target Data Storage System 150 each include at least one storage processor, shown in Source Data Storage System 120 by Storage Processor 122, and shown in Target Data Storage System 150 by Storage Processor 152. Storage Processor 122 and Storage Processor 152 each include communication interfaces that are connected to Data Path 170. Each storage processor is further communicably coupled to physical non-volatile data storage drives of the respective storage system. For example, Storage Processor 122 is communicably coupled to Non-Volatile Data Storage Drives 134 of Source Data Storage System 120, and Storage Processor 152 is communicably coupled to Non-Volatile Data Storage Drives 164 of Target Data Storage System 150. Storage Processor 122 and Storage Processor 152 may be embodied as any specific type of device that is capable of processing host input/output (I/O) requests (e.g. I/O read requests and I/O write requests, etc.), and of persistently storing host data.

Non-Volatile Data Storage Drives 134 and Non-Volatile Data Storage Drives 164 may, for example, be embodied as solid state drives (SSDs), or alternatively as some other specific type of data storage drives.

The Host 100, Storage Processor 122, and Storage Processor 152 each include memory and processing circuitry. Host 100 includes Memory 104 and Processing Circuitry 102, Storage Processor 122 includes Memory 124 and Processing Circuitry 126, and Storage Processor 152 includes Memory 154 and Processing Circuitry 156. The memory in each one of the Host 100, Storage Processor 122, and Storage Processor 152 may be volatile memory (e.g. DRAM), and/or other types of memory. The memory in each one of the Host 100, Storage Processor 122, and Storage Processor 152 stores program code that is executed on the processing circuitry of the respective device, as well as data generated and/or processed by such program code. The processing circuitry in each device may include or consist of multiple processor cores, e.g. within one or more multi-core processor packages, each of which is made up of electronic circuitry that independently executes instructions, e.g. instructions within the program code stored in the memory of the respective device.

The processing circuitry and memory in each one of the Host 100, Storage Processor 122, and Storage Processor 152 together form control circuitry that is configured and arranged to carry out the various methods and functions described herein. Each memory is shown storing a variety of software components that may be provided in the form of executable program code. When the program code stored in Memory 104 is executed on Processing Circuitry 102, the program code stored in Memory 124 is executed on Processing Circuitry 126, and the program code stored in Memory 154 is executed on Processing Circuitry 156, Processing Circuitry 102, Processing Circuitry 126, and Processing Circuitry 156 are caused to carry out the operations described herein. Although certain software components are shown in the Figures and described herein for purposes of illustration and explanation, those skilled in the art will recognize that the memory of each device may also include various other specific types of software components.

During operation of the illustrative embodiment shown in FIG. 1, in response to a Copy Command 106, Host 100 (e.g. Copy Logic 108) copies Data 136 from Source Data Storage System 120 to Target Data Storage System 150. The Copy Command 106 may be generated within Host 100, and/or may be received by Host 100 from an external system. Copy Command 106 may be received from any type of software that copies data from Source Data Storage System 120 to Target Data Storage System 150. For example, in some embodiments, Copy Command 106 may be issued in order to copy a snapshot (a point in time copy) of a storage volume of the non-volatile data storage within Non-Volatile Data Storage Drives 134 that is being served from Source Data Storage System 120 to Host 100, and that stores data received from Host 100. In such a case, Data 136 may be a most recent snapshot of the storage volume, and a Previous Snapshot 168 of the storage volume may have previously been copied in its entirety from Source Data Storage System 120 to Target Data Storage System 150.

In response to the Copy Command 106, an optimized copy operation is first performed by Host 100, e.g. by Host Optimized Copy Logic 110. The optimized copy operation includes Host 100 reading an optimized version of Data 136 from Source Data Storage System to Host 100. For example, Host 100 may request the optimized version of Data 136 from Storage System Optimized Copy Logic 128 over Data Path 170 or some other communication channel between Host 100 and Source Data Storage System 120. Storage System Optimized Copy Logic 128 then transmits the optimized version of Data 136 to Host 100 over Data Path 170, and Host 100 stores the optimized version of Data 136, e.g. in Memory 104. The optimized copy operation further includes Host 100 writing the optimized version of Data 136 from Host 100 (e.g. from Memory 104) over Data Path 170 to the Target Data Storage System 150, where it is stored in Memory 154 and/or Non-Volatile Data Storage Drives 164. In this way, Host 100 reads the optimized version of the data from Source Data Storage System 120 and writes the optimized version of the data to Target Data Storage System 150 over Data Path 170, which is separate from and independent of the Error Detection Communication Channel 170.

Target Data Storage System 150 (e.g. Storage System Optimized Copy Logic 158) generates Complete Unoptimized Copy 166 of Data 136 using the optimized version of Data 136 it receives from Host 100, and stores it in Non-Volatile Data Storage Drives 164 and/or Memory 154. As further described below, in some embodiments, Storage System Optimized Copy Logic 158 may also use Previous Snapshot 168 of the storage volume when generating Complete Unoptimized Copy 166.

Target Data Storage System 150 (e.g. Error Detection Logic 162) obtains, from Source Data Storage System 120 through Error Detection Communication Channel 170, data verification information that is used by Error Detection Logic 162 to verify that Complete Unoptimized Copy 166 is a correct copy of Data 136. Error Detection Communication Channel 170 is a communication channel that directly connects Source Data Storage System 120 and Target Data Storage System 150. Error Detection Communication Channel 170 is independent from Host 100, and communications over Error Detection Communication Channel 170 are not passed through or seen by Host 100. For example, in some embodiments, in response to Copy Command 106, Data Copy Logic 108 notifies Target Data Storage System 150 (e.g. over Data Path 170 or some other communication channel between Host 100 and Target Data Storage System 150) that Data 136 in Source Data Storage System 120 is about to be copied by Host 100 to Target Data Storage System 150. In response to this notification, Target Data Storage System 150 (e.g. Error Detection Logic 162) may operate to establish the Error Detection Channel 170 between Source Data Storage System 120 and Target Data Storage System 150, e.g. by discovering Source Data Storage System 120 over a management network or the like to which Source Data Storage System 120 and Target Data Storage System 150 are both physically connected, and then performing a handshake process with Source Data Storage System 120 that establishes a secure communication session between Target Data Storage System 150 and Source Data Storage System 120. Error Detection Logic 162 may then request over Error Detection Channel 170 that the data verification information be transmitted from Error Detection Logic 132 over Error Detection Channel 170 to Error Detection Logic 162, and Error Detection Logic 132 responds by providing the data verification information over Error Detection Channel 170 to Error Detection Logic 162. The communication session established to provide Error Detection Channel 170 for the purpose of communicating the data verification information between Source Data Storage System 120 and Target Data Storage System 150 that is related to the copying of Data 136 from Source Data Storage System 120 to Target Data Storage System 150 may, for example, be terminated (e.g. by Error Detection Logic 162) after Data 136 has been successfully copied to Target Data Storage System 150.

Source Data Storage System 120 and Target Data Storage System 150 may both operate on the data that they store based on fixed size data units that are referred to herein for purposes of explanation as "chunks", e.g. 512 byte units of data. Any other terminology or size of data unit may be used in the alternative. In some embodiments, the data verification information obtained by Error Detection Logic 162 from Error Detection Logic 132 is multiple checksums calculated by Error Detection Logic 132, e.g. a checksum calculated for each individual chunk within Data 136. Error Detection Logic 162 may similarly calculate a checksum for each individual chunk within Complete Unoptimized Copy 166. Error Detection Logic 162 compares the checksums of corresponding chunks in Data 136 and Complete Unoptimized Copy 166, and stores an indication of the location (e.g. offset) of any chunk or chunks in Complete Unoptimized Copy 166 for which the checksum generated by Error Detection Logic 162 does not match the checksum of the corresponding chunk in Data 136 that was provided from Source Data Storage System 120 over Error Detection Channel 170. In this way, during or subsequent to the optimized copy operation, Error Detection Logic 162 may use i) the data verification information obtained from Error Detection Logic 132 and ii) Complete Unoptimized Copy 166 of Data 136 in Target Data Storage System 150 to perform an error detection operation that identifies any chunk of data within Complete Unoptimized Copy 166 of Data 136 that does not match the corresponding chunk in Data 136 in Source Data Storage System 120. Target Data Storage System 150 informs Host 100 of the location (e.g. offset) of all chunks in Complete Unoptimized Copy 166 that do not match the corresponding chunk in Data 136, e.g. using a mismatch location bitmap or the like. For example, Target Data Storage System 150 may inform Host 100 of the location(s) of any chunk(s) in Complete Unoptimized Copy 166 that do not match the corresponding chunk in Data 136 over an Error Correction Channel 171 established between Target Storage System 150 and Host 100, e.g. over a management network or the like.

The data verification information obtained from Error Detection Logic 132 may alternatively consist of checksums that are calculated by Error Detection Logic 132 for logically contiguous groups of multiple chunks within Data 136, and the comparison performed by Error Detection Logic 162 may be to checksums calculated by Error Detection Logic 162 for corresponding groups of multiple chunks within the Complete Unoptimized Copy 166.

The error detection operation performed by Error Detection Logic 162, and the optimized copy operation performed by Host Optimized Copy Logic 110, may be performed at least partly in parallel (i.e. concurrently). In this way, error detection may be performed by Error Detection Logic 162 as chunks of data read from Source Data Storage System 120 during the optimized copy operation are received by Target Data Storage System 150 from Host 100, without Error Detection Logic 162 having to wait until all the chunks read by Host 100 from Source Data Storage System 120 for the optimized copy operation have been written to Target Data Storage System 150.

Error Detection Logic 162 may identify, during the error detection operation, at least one chunk within the Complete Unoptimized Copy 166 that does not match the corresponding chunk in Data 136 in Source Data Storage System 120. As mentioned above, in such a case, Target Data Storage System 150 notifies Host 100 of the location (e.g. offset) of the at least one chunk within Complete Unoptimized Copy 166 that does not match the corresponding chunk(s) in Data 136 in Source Data Storage System 120. Target Data Storage System 150 may send Host 100 the mismatch location bitmap indicating the location(s) of the at least one chunk within Complete Unoptimized Copy 166 that does not match the corresponding chunk(s) in Data 136 in Source Data Storage System 120 over Data Path 170 or some other communication channel between Host 100 and Target Data Storage System 150.

In response to receipt by the Host 100 of the indication from Target Data Storage System 150 of the at least one chunk within Complete Unoptimized Copy 166 of Data 136 in Target Data Storage System 150 that does not match the corresponding chunk(s) in Data 136 in Source Data Storage System 120, Host 100 (e.g. Host Unoptimized Copy Logic 112) performs an unoptimized copy operation that reads an unoptimized version of only a portion of Data 136 from Source Data Storage System 120. For example, the portion of Data 136 may be read into Memory 104. The portion of Data 136 read by Host 100 from Source Data Storage System 120 (e.g. from Storage System Unoptimized Copy Logic 130) during the unoptimized copy operation is smaller in size than Data 136, and includes or consists of the chunk or chunks within Data 136 in Source Data Storage System 120 that each correspond to the chunk or chunks within Complete Unoptimized Copy 166 in Target Data Storage System 150 that do not match the corresponding chunk of Data 136 in Source Data Storage System 120.

Host 100 then writes the unoptimized version of the portion of Data 136 from Host 100 to Target Data Storage System 150. The retrieval by Host 100 from Source Data Storage System 120 of the unoptimized version of the portion of Data 136, and the writing of the retrieved unoptimized version of the portion of Data 136, advantageously avoids use of data optimization logic within Source Data Storage System 120, e.g. Storage System Optimized Copy Logic 128, which may be responsible for the detected data mismatch.

After receiving the unoptimized version of the portion of Data 136 from Host 100, Target Data Storage System 150

(e.g. Storage System Unoptimized Copy Logic 160) generates, e.g. in Memory 154 and/or Non-Volatile Data Storage Drives 164, and using i) the unoptimized version of the portion of Data 136 and ii) Complete Unoptimized Copy 166, a new complete unoptimized copy of Data 136. Target Data Storage System 150 (e.g. Error Detection Logic 162) then performs, using the previously received data verification information and the new complete unoptimized copy of Data 136, a second error detection operation that identifies any chunk within the new complete unoptimized copy of Data 136 that still does not match the corresponding chunk in Data 136 in Source Data Storage System 120. In response to the second error detection operation identifying no chunk within the new complete unoptimized copy of Data 136 that does not match the corresponding chunk in Data 136 in Source Data Storage System 120, the Target Data Storage System 150 (e.g. Error Detection Logic 162) indicates to Host 100 (e.g. over Data Path 170 or some other communication channel between Host 100 and Target Data Storage System 150) that Data 136 has been successfully copied to Target Data Storage System 150.

The error detection operation performed by Error Detection Logic 162, and the unoptimized copy operation performed by Host Unoptimized Copy Logic 112, may be performed at least partly in parallel (i.e. concurrently). In this way, error detection may be performed by Error Detection Logic 162 (e.g. on the new complete unoptimized copy) while chunks of unoptimized data are read by Host 100 from Source Data Storage System 120 during the unoptimized copy operation, and as the chunks of unoptimized data are received by Target Data Storage System 150 from Host 100, without requiring Error Detection Logic 162 to wait until all after of the unoptimized chunks read by Host 100 from Source Data Storage System 120 for the unoptimized copy operation have been written to Target Data Storage System 150.

As noted above, in some embodiments, Data 136 in Source Data Storage System 120 may be a most recent snapshot of a storage volume of non-volatile storage in Source Data Storage System 120 that is consumed by Host 100. In such embodiments, a Previous Snapshot 168 that was taken of the same storage volume at a previous point in time has previously been copied in its entirety from Source Data Storage System 129 to the Target Data Storage System 150. Host 100 (e.g. Host Optimized Copy Logic 110) may perform the optimized copy operation at least in part by first obtaining (e.g. requesting and being sent over Data Path 170 or some other communication channel between Host 100 and Source Data Storage System 120) a difference list from Source Data Storage System 120 (e.g. from Storage System Optimized Copy Logic 128). The difference list obtained from Source Data Storage System 120 may be a bitmap indicating the locations (e.g. offsets) of the chunks in the most recent snapshot of the storage volume that differ from the corresponding chunks in Previous Snapshot 168. Further in the optimized copy operation, Host 100 (e.g. Host Optimized Copy Logic 110) may read from Source Data Storage System 120 and into Memory 104, based on the difference list, as the optimized version of the Data 136, the chunks of the most recent snapshot of the storage volume that differ from the corresponding chunks in Previous Snapshot 168 of the storage volume. Host 100 then writes the optimized version of the Data 136, in this case consisting of the chunks of the most recent snapshot of the storage volume that differ from the corresponding chunks in Previous Snapshot 168 of the storage volume, from Memory 104 to the Target Data Storage System 150.

Host 100 (e.g. Host Unoptimized Copy Logic 112) may perform the unoptimized copy operation at least in part by i) mounting the most recent snapshot of the storage volume in Source Data Storage System 120 to enable complete and unoptimized access to the most recent snapshot by Host 100, ii) reading the unoptimized version of the portion of the data from the mounted most recent snapshot in the Source Data Storage System 120, and iii) un-mounting the most recent snapshot of the storage volume in Source Data Storage System 120 when the unoptimized copy operation is completed.

As noted above, in some embodiments, Target Data Storage System 150 may indicate the at least one chunk within Complete Unoptimized Copy 166 that does not match Data 136 in Source Data Storage System 120 by sending a mismatch location bitmap to Host 100 indicating the positions (e.g. offsets) of any chunks within Complete Unoptimized Copy 166 that do not match the corresponding chunks in Data 136 in Source Data Storage System 120. In such embodiments, Host 100 (e.g. Host Unoptimized Copy Logic 112) may perform the unoptimized copy operation by using the mismatch location bitmap to read each one of those chunks of Data 136 indicated by the mismatch bitmap from Data 136 in Source Data Storage System 120, e.g. using SCSI commands or the like conveyed to Source Data Storage System 120 over Data Path 170. Similarly, Host 100 then writes those chunks that were read from Data 136 based on the mismatch location bitmap to Target Data Storage System 150, where they are used to generate a new complete unoptimized copy of Data 136, e.g. by Storage System Unoptimized Copy Logic 160.

It should be recognized that the at least one chunk within the Complete Unoptimized Copy 166 stored in Target Data Storage System 150 that does not match the corresponding chunk(s) in Data 136 stored in Source Data Storage System 120 may, for example, be a chunk of the Data 136 that is not one of the chunks indicated by the difference list obtained during the optimized copy operation. Such a case may arise when the logic in Storage System Optimized Copy Logic 128 for generating the difference list has a bug.

In an alternative embodiment, the optimized version of the Data 136 may not be those chunks of a most recent snapshot of a storage volume that differ from corresponding chunks in a previous snapshot of the storage volume. Instead, the optimized version of Data 136 may be a compressed version of Data 136, generated by Storage System Optimized Copy Logic 128. In such an embodiment, Complete Unoptimized Copy 166 is generated by Storage System Optimized Copy Logic 158 decompressing the optimized version of Data 136 that is written to Target Data Storage System 150. Further in such an embodiment, the unoptimized version of the portion of Data 136 may be an uncompressed version of the portion of Data 136, and may be provided to Host 100 by Storage System Unoptimized Copy Logic 130.

In another alternative embodiment in which the optimized version of the Data 136 is not those chunks of a most recent snapshot of a storage volume that differ from corresponding chunks in a previous snapshot of the storage volume, the optimized version of Data 136 may instead be a deduplicated version of Data 136, generated by Storage System Optimized Copy Logic 128. In such an embodiment, Complete Unoptimized Copy 166 is generated by Storage System Optimized Copy Logic 158 reassembling the deduplicated version of Data 136 into its original, un-deduplicated form, a process sometimes referred to as "rehydrating" the data. Similarly in such an embodiment, the unoptimized version of the portion of Data 136 may be an un-deduplicated version of the portion of Data 136, and may be provided to Host 100 by Storage System Unoptimized Copy Logic 130.

In another alternative embodiment in which the optimized version of the Data 136 is not those chunks of a most recent snapshot of a storage volume that differ from corresponding chunks in a previous snapshot of the storage volume, the optimized version of Data 136 may instead be an encrypted version of Data 136, generated by Storage System Optimized Copy Logic 128. In such an embodiment, Complete Unoptimized Copy 166 is generated by Storage System Optimized Copy Logic 158 decrypting the encrypted version of Data 136 into its original form. Similarly in such an embodiment, the unoptimized version of the portion of Data 136 may be an un-encrypted version of the portion of Data 136, and may be provided to Host 100 by Storage System Unoptimized Copy Logic 130.

Figure 2:
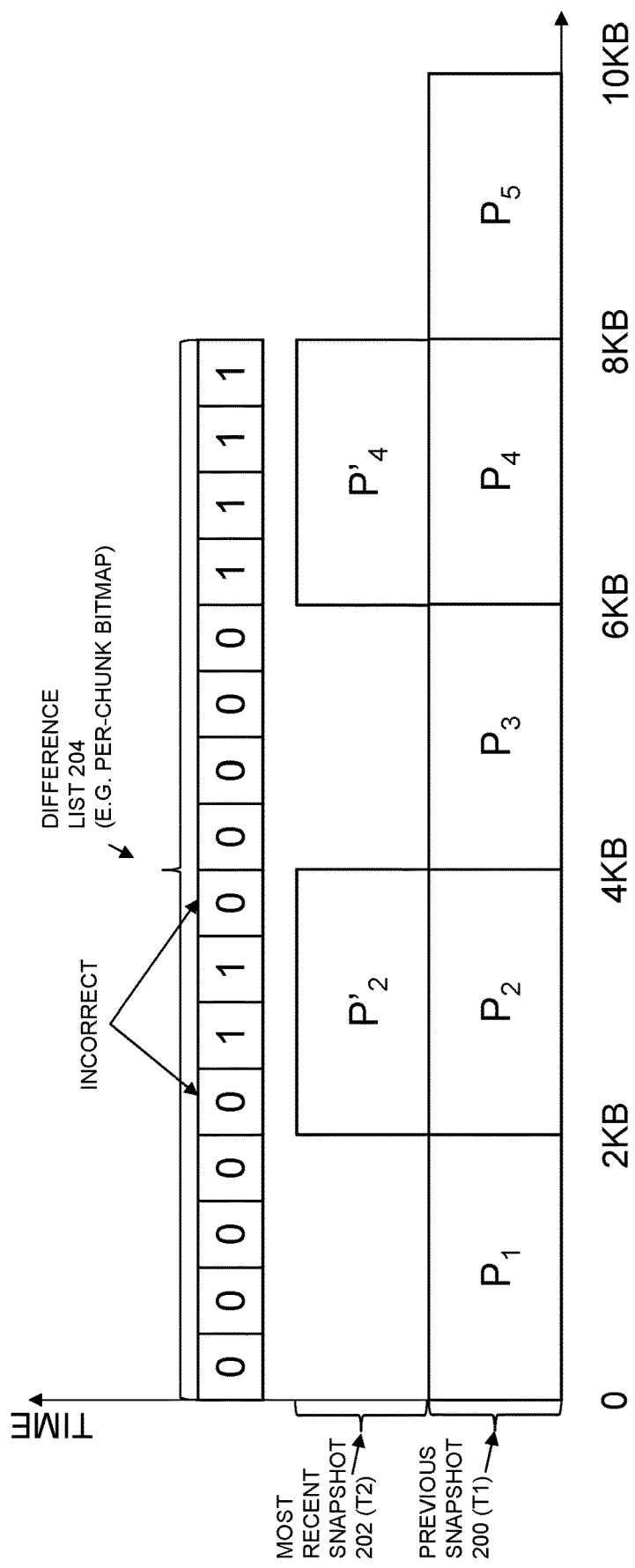
FIG. 2 is a block diagram illustrating an example of operation of some embodiments of the disclosed technology.

FIG. 2 is a block diagram illustrating an example of operation of some embodiments of the disclosed technology. In FIG. 2, Source Data Storage System 120 serves a storage volume having a size of 10 KB to the Host 100. Further in the example of FIG. 2, a page size used by Source Data Storage System 120 and Target Data Storage System 150 is 2 KB, and each page is made up of four chunks, e.g. chunks 0, 1, 2, and 3, each of which is 512 bytes.

At time T1, the Previous Snapshot 200 is taken on the Source Data Storage System 120. Previous Snapshot 200 consists of pages $P_1$, $P_2$, $P_3$, $P_4$, and $P_5$. Previous Snapshot 200 is conveyed in its entirety by Host 100 to Destination Data Storage System 150. Previous Snapshot 200 is an example of Previous Snapshot 168 in FIG. 1.

After time T1 when Previous Snapshot 200 was taken, pages $P_2$ and $P_4$ of the storage volume are completely overwritten by $P'_2$ and $P'_4$ respectively (e.g. by Host 100), while $P_1$, $P_3$, and $P_5$ remain unchanged. At time T2, after the overwriting of $P_2$ and $P_4$, another snapshot of the storage volume is taken, e.g. Most Recent Snapshot 202. Most Recent Snapshot 202 is therefore made up of $P_1$, $P'_2$, $P_2$, $P'_4$, and $P_5$. When the disclosed technology operates to copy Most Recent Snapshot 202 from Source Data Storage System 120 to Target Data Storage System 150, Host 100 performs the optimized copy operation by requesting a difference list for Most Recent Snapshot 202 from Source Data Storage System 120. In response, in the example of FIG. 2, Source Data Storage System 120 provides Host 100 with Difference List 204. Difference List 204 is a bitmap having a bit corresponding to each chunk in Most Recent Snapshot 202. Each set bit in Difference List 204 indicates to that the corresponding chunk in Most Recent Snapshot 202 has been changed relative to Previous Snapshot 200, while each clear bit indicates that the corresponding chunk in Most Recent Snapshot 202 is the same as in Previous Snapshot 200. However, due to a bug in Storage System Optimized Copy Logic 128 in Source Data Storage System 120, the bits in Difference List 204 corresponding to chunks 0 and 3 of the second page of Most Recent Snapshot 202 are not set, thus incorrectly indicating that those chunks are unchanged from $P_1$ of Previous Snapshot 200.

Further during the optimized copy operation, Host 100 reads, based on Difference List 204, an optimized version of Most Recent Snapshot 202, by reading from Source Data Storage System 120 only those chunks of Most Recent Snapshot 202 that correspond to set bits in Difference List 204, which should be the chunks of Most Recent Snapshot 202 that differ from Previous Snapshot 200. However, due to the incorrect bit values in Difference List 204 for chunks 0 and 3 in the second page of Most Recent Snapshot 202, the optimized version of Most Recent Snapshot 202 that is read by Host 100 does not include chunks 0 and 3 from $P'_2$. Instead, the optimized version of Most Recent Snapshot 202 that is read by Host 100 from Source Data Storage System 120 and then written by Host 100 to Target Data Storage System 150 consists only of chunks 1 and 2 of $P'_2$, and chunks 0, 1, 2, and 3 of $P'_4$.

Accordingly, when Target Data Storage System 150 (e.g. Storage System Optimized Copy Logic 158) generates Complete Unoptimized Copy 166 using the optimized version of Most Recent Snapshot 202 and Previous Snapshot 200, it incorrectly uses chunks 0 and 3 of $P_2$ in the Previous Snapshot 200, resulting in a Complete Unoptimized Copy 166 of Most Recent Snapshot 202 that consists of a first page having chunks 0, 1, 2 and 3 of $P_1$, a second page having chunks 0 and 3 from $P_2$ and chunks 1 and 2 from $P'_2$, a third page having chunks 0, 1, 2, and 3 of $P_3$, a fourth page having chunks 0, 1, 2, and 3 of $P'_3$, and a fifth page having chunks 0, 1, 2, and 3 of page $P_5$.

Advantageously, the disclosed technology (e.g. Error Detection Logic 162) promptly detects this potential data corruption during the error detection operation. Source Data Storage System 120 (e.g. Error Detection Logic 132) calculates the checksums for chunks 0 and 3 in the second page of the Most Recent Snapshot 202 that are contained in the data verification information that is sent to Target Data Storage System 150 using program logic (e.g. Error Detection Logic 132 in FIG. 1) that is independent of the program logic that generated the faulty Difference List 204 (e.g. Storage System Optimized Logic 128). Accordingly, the checksums for chunks 0 and 3 in the second page of Most Recent Snapshot 202 that are sent in the data verification information transmitted from Source Data Storage System 120 to Destination Data Storage system are the checksums for chunks 0 and 3 of $P'_2$. Error Detection Logic 162 in Target Data Storage System 150 detects that the checksums calculated by Error Detection Logic 162 for chunks 0 and 3 of the second page in the Complete Unoptimized Copy 166 do not match the checksums received from Source Data Storage System 120 for the corresponding chunks in Most Recent Snapshot 202. Error Detection Logic 162 then indicates to Host 100 that chunks 0 and 3 of the second page in Complete Unoptimized Copy 166 do not match the corresponding chunks in Most Recent Snapshot 202, e.g. using a mismatch location bitmap or the like. Host 100 (e.g. Host Unoptimized Copy Logic 112) then performs an unoptimized copy operation that reads chunks 0 and 3 of the second page in Complete Unoptimized Copy 166, e.g. by using the mismatch location bitmap to read chunks 0 and 3 of the second page in Most Recent Snapshot 202, and then writes chunks 0 and 3 of the second page in Most Recent Snapshot 202 to Target Data Storage System 150. Target Data Storage System 150 (e.g. Storage System Unoptimized Logic 160) then generates a new Complete Unoptimized Copy 166, and Error Detection Logic 162 verifies that no chunks within the new Complete Unoptimized Copy 166 differ from the corresponding chunks in Most Recent Snapshot 202 using the previously conveyed data verification information. Target Data Storage System 120 then indicates to Host 100 that Most Recent Snapshot 202 has been successfully copied to Target Data Storage System 150. Host 100 and/or Target Data Storage System 150 may report the detection and correction of the potential data corruption to a monitoring and analyzing system, along with indications of relevant log portions, so that the bug can be promptly located and addressed.

Figure 3:
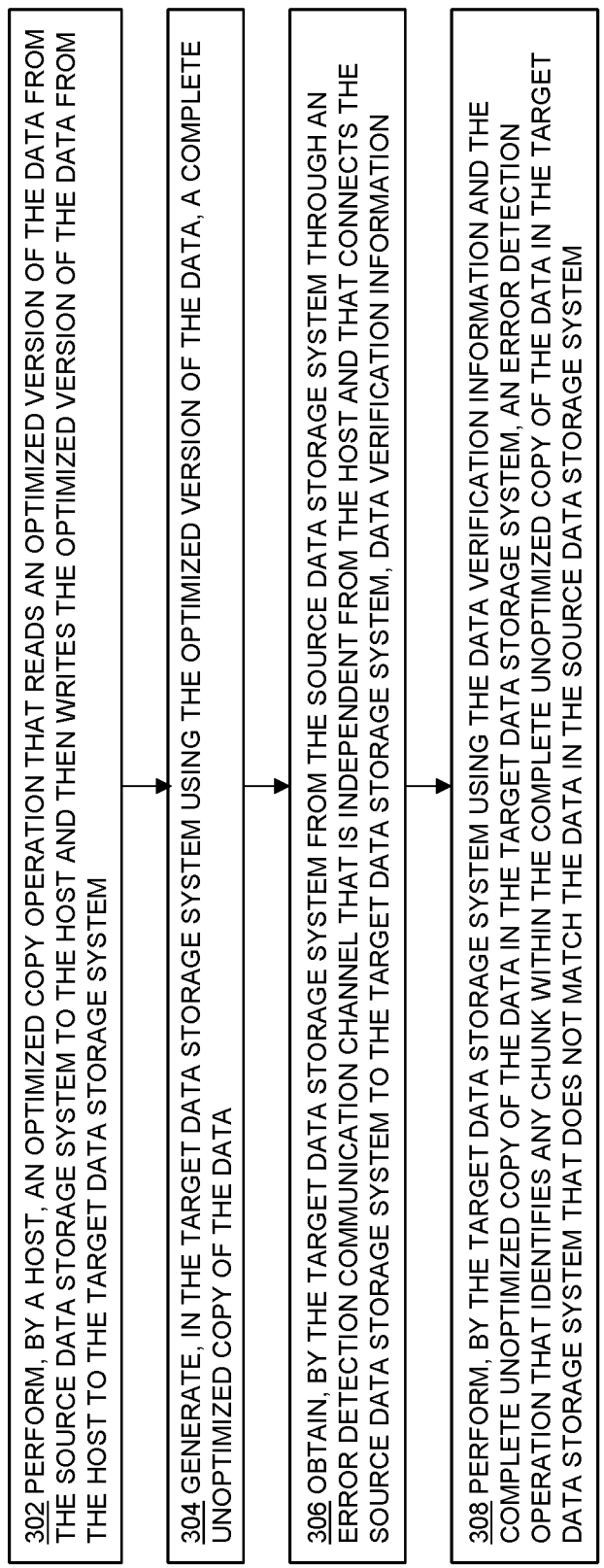
FIG. 3 is a flow chart showing an example of steps performed in some embodiments.

FIG. 3 is a flow chart showing an example of steps performed in some embodiments.

In step 302, the host performs an optimized copy operation that i) reads an optimized version of the data from the source data storage system to the host, and then ii) writes the optimized version of the data from the host to the target data storage system.

In step 304, the target data storage system generates a complete unoptimized copy of the data using the optimized version of the data.

In step 306, the target data storage system obtains data verification information from the source data storage system through an error detection communication channel that is independent from the host and that connects the source data storage system to the target data storage system.

In step 308, the target data storage system performs an error detection operation that identifies any chunk within the complete unoptimized copy of the data in the target data storage system that does not match the data in the source data storage system using the data verification information and the complete unoptimized copy of the data in the target data storage system.

As will be appreciated by those skilled in the art, aspects of the technology disclosed herein may be embodied as a system, method, or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of copying data from a source data storage system to a target data storage system, comprising:
   performing, by a host, an optimized copy operation that reads an optimized version of the data from the source data storage system to the host and then writes the optimized version of the data from the host to the target data storage system;
   generating, in the target data storage system using the optimized version of the data, a complete unoptimized copy of the data;
   obtaining, by the target data storage system from the source data storage system through an error detection communication channel that is independent from the host and that connects the source data storage system to the target data storage system, data verification information; and
   performing, by the target data storage system using the data verification information and the complete unoptimized copy of the data in the target data storage system, an error detection operation that identifies any chunk within the complete unoptimized copy of the data in the target data storage system that does not match the data in the source data storage system.

2. The method of claim 1, further comprising:
   identifying, by the target data storage system during the error detection operation, at least one chunk within the complete unoptimized copy of the data stored in the target data storage system that does not match the data in the source data storage system;
   indicating, to the host by the target data storage system, the at least one chunk within the complete unoptimized copy of the data stored in the target data storage system that does not match the data in the source data storage system; and
   in response to the indication from the target data storage system of the at least one chunk within the complete unoptimized copy of the data in the target data storage system that does not match the data in the source data storage system, performing, by the host, an unoptimized copy operation that reads an unoptimized version of a portion of the data from the source data storage system, wherein the portion includes at least one chunk within the data in the source data storage system corresponding to the at least one chunk within the complete unoptimized copy of the data in the target data storage system that does not match the data in the source data storage system and writes the unoptimized version of the portion of the data from the host to the target data storage system.

3. The method of claim 2, further comprising:
generating, in the target data storage system using the unoptimized version of the portion of the data, a new complete unoptimized copy of the data;
performing, by the target data storage system using the data verification information and the new complete unoptimized copy of the data in the target data storage system, a second error detection operation that identifies any chunk within the new complete unoptimized copy of the data in the target data storage system that does not match the data stored in the source data storage system; and
in response to identifying no chunks within the new complete unoptimized copy of the data in the target data storage system that do not match the data stored in the source data storage system, indicating, by the target data storage system to the host, that the data has been successfully copied to the target data storage system.

4. The method of claim 3, wherein the data comprises a most recent snapshot of a storage volume;
wherein a previous snapshot of the storage volume was copied in its entirety from the source data storage system to the target data storage system at a previous point in time; and
wherein performing the optimized copy operation includes the host:
obtaining a difference list from the source data storage system, the difference list indicating which chunks of the most recent snapshot of the storage volume differ from the previous snapshot of the storage volume,
reading, based on the difference list, the chunks of the most recent snapshot of the storage volume that differ from the previous snapshot of the storage volume, and
writing the chunks of the most recent snapshot of the storage volume that differ from the previous snapshot of the storage volume to the target data storage system.

5. The method of claim 4, wherein performing the unoptimized copy operation includes the host:
mounting the most recent snapshot of the storage volume in the source data storage system for complete and unoptimized access by the host;
reading the unoptimized version of the portion of the data from the mounted most recent snapshot in the source data storage system; and
unmounting the most recent snapshot of the storage volume in the source data storage system when the unoptimized copy operation is completed.

6. The method of claim 4, wherein the at least one chunk within the complete unoptimized copy of the data stored in the target data storage system that does not match the data in the source data storage system is not one of the chunks indicated by the difference list.

7. The method of claim 2, wherein the optimized version of the data is a compressed version of the data;
wherein the unoptimized version of the portion of the data is an uncompressed version of the portion of the data; and
wherein the complete unoptimized copy of the data is an uncompressed version of the data.

8. The method of claim 2, wherein the optimized version of the data is a deduplicated version of the data;
wherein the unoptimized version of the portion of the data is a non-deduplicated version of the portion of the data; and
wherein the complete unoptimized copy of the data is a non-deduplicated version of the data.

9. The method of claim 2, wherein the optimized version of the data is an encrypted version of the data;
wherein the unoptimized version of the portion of the data is a non-encrypted version of the portion of the data; and
wherein the complete unoptimized copy of the data is a non-encrypted version of the data.

10. The method of claim 2, wherein the target data storage system indicates the at least one chunk within the complete unoptimized copy of the data stored in the target data storage system that does not match the data in the source data storage system by sending a mismatch location bitmap to the host indicating positions of chunks within the complete unoptimized copy of the data stored in the target data storage system that do not match the data in the source data storage system.

11. The method of claim 10, wherein the host performs the unoptimized copy operation by:
using the mismatch location bitmap to read the chunks of a most recent snapshot of a storage volume that are indicated by the mismatch location bitmap from the data stored in the source data storage system; and
writing the chunks of the most recent snapshot of the storage volume that were read from the data stored in the source data storage system based on the mismatch location bitmap to the target data storage system.

12. The method of claim 2, wherein the error detection operation and the unoptimized copy operation are performed at least partly in parallel.

13. The method of claim 1, wherein the data verification information comprises a plurality of checksums generated by the source data storage system based on the data; and
wherein the error detection operation includes the target data storage system comparing the checksums generated by the source data storage system based on the data to a plurality of checksums generated by the target data storage system based on the complete unoptimized copy of the data.

14. The method of claim 1, wherein the host reads the optimized version of the data from the source data storage system and writes the optimized version of the data to the target data storage system over a data path that is separate from the error detection communication channel that connects the source data storage system to the target data storage system.

15. The method of claim 1, wherein the error detection operation and the optimized copy operation are performed at least partly in parallel.

16. A system comprising:
a host including processing circuitry and memory, wherein the memory has program code stored thereon;
a source data storage system including processing circuitry and memory, wherein the memory has program code stored thereon; and
a target data storage system including processing circuitry and memory, wherein the memory has program code stored thereon;
wherein the program code, when executed, copies data from the source data storage system to the target data storage system by causing the processing circuitries to:
perform, by the host, an optimized copy operation that reads an optimized version of the data from the source data storage system to the host and then writes the optimized version of the data from the host to the target data storage system;

generate, in the target data storage system using the optimized version of the data, a complete unoptimized copy of the data;

obtain, by the target data storage system from the source data storage system through an error detection communication channel that is independent from the host and that connects the source data storage system to the target data storage system, data verification information; and perform, by the target data storage system using the data verification information and the complete unoptimized copy of the data in the target data storage system, an error detection operation that identifies any chunk within the complete unoptimized copy of the data in the target data storage system that does not match the data in the source data storage system.

17. A computer program product including a non-transitory computer readable medium having instructions stored thereon, wherein the instructions, when executed on processing circuitry, cause the processing circuitry to copy data from a source data storage system to a target data storage system by performing steps including:

performing, by a host, an optimized copy operation that reads an optimized version of the data from the source data storage system to the host and then writes the optimized version of the data from the host to the target data storage system;

generating, in the target data storage system using the optimized version of the data, a complete unoptimized copy of the data;

obtaining, by the target data storage system from the source data storage system through an error detection communication channel that is independent from the host and that connects the source data storage system to the target data storage system, data verification information; and performing, by the target data storage system using the data verification information and the complete unoptimized copy of the data in the target data storage system, an error detection operation that identifies any chunk within the complete unoptimized copy of the data in the target data storage system that does not match the data in the source data storage system.

* * * * *